2,556,225

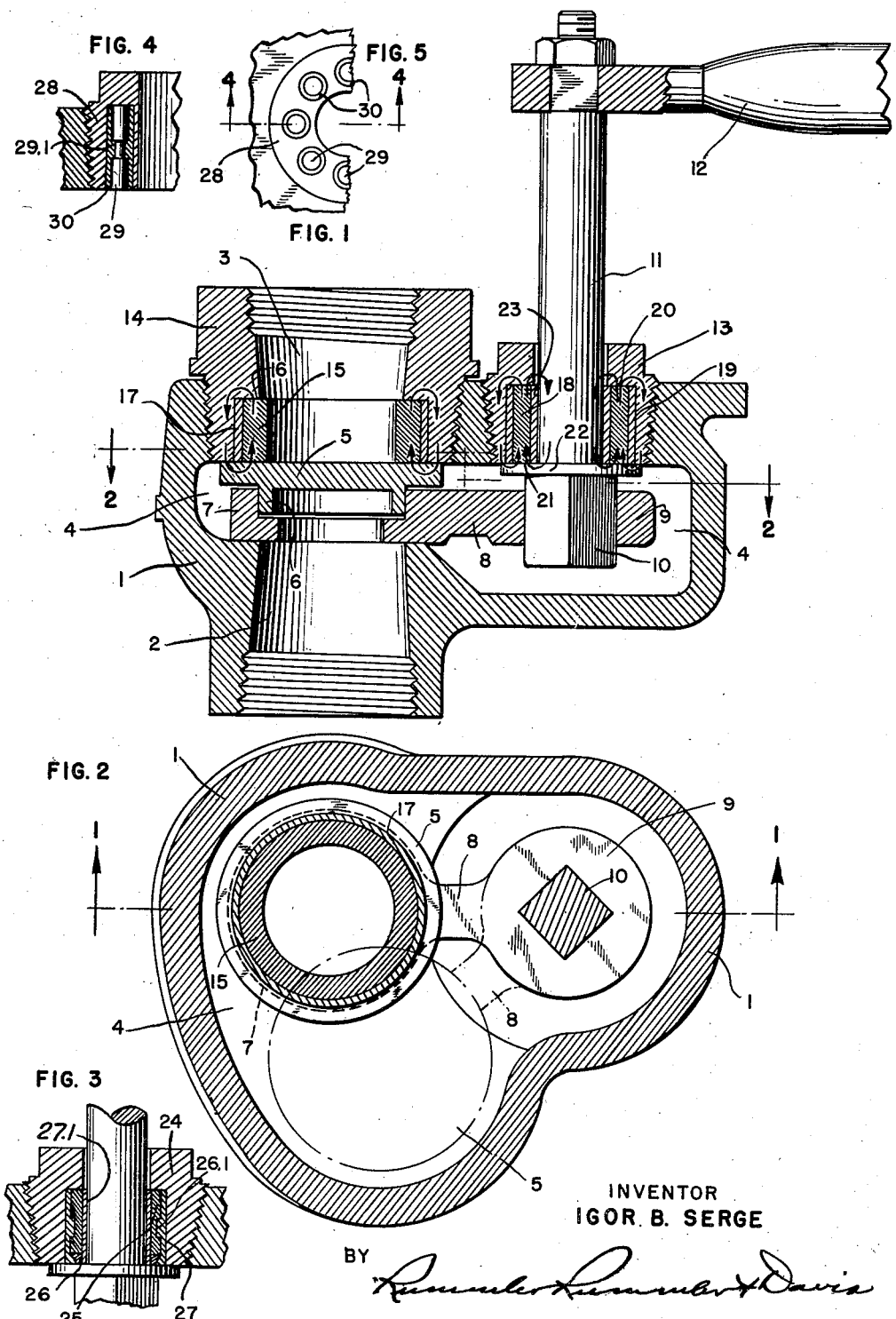
June 12, 1951 — I. B. SERGE — 2,556,225
MAGNETIC VALVE
Filed March 21, 1946
INVENTOR
IGOR B. SERGE
ATTORNEYS Patented June 12, 1951

UNITED STATES PATENT OFFICE 2,556,225

MAGNETIC VALVE

Igor B. Serge, Beverly Hills, Calif., assignor of one-half to Joseph J. Day, Chicago, Ill.

Application March 21, 1946, Serial No. 656,030

14 Claims. (Cl. 137—139)

This invention relates to valve structures and particularly to expedients for utilizing magnetism to assure a leak-proof seal for moving parts.

The main objects of this invention are to provide an improved magnetic valve structure that will have a long useful life and practically unlimited durability in the leak-proofness of its moving parts; to provide an improved construction for sealing the contacting surfaces of relatively sliding members of valves and analogous structures involving the sealing of moving parts against fluid leakage, without requiring the use of springs or packing; to provide specifically an improved construction for sealing the sliding contacting surfaces of gate valves; to provide an improved construction of this kind that is adaptable for the elimination of the need for packing the stems or shafts of valves to prevent leakage; to provide an improved form and arrangement of a permanent magnet for use in devices of this kind; to provide improved means to intensify the concentration of magnetic flux at points where the magnet contributes to the sealing of the valve structure; to provide improved means for utilizing magnetic force to assure tightness of the sealing of a moving part with a minimum of resistance to the movement of such part; and to provide means for concentration of magnetic flux at sealing points or surfaces of magnetic sealing devices of this kind.

Although it is apparent that the magnet may be incorporated in either of two relatively slidable members whose joint is to be sealed in accordance with this invention, certain specific embodiments wherein the magnets are in the stationary member have been selected, as a basis for disclosure of the invention. In the drawings—

Figure 1 is a section taken longitudinally through the fluid passage and operating stem of a gate-valve constructed according to this invention, as indicated by line 1—1 of Fig. 2.

Fig. 2 is a transverse section indicated roughly by the stepped line 2—2 of Fig. 1. The sectional indication of the housing is all taken at the level of the right-hand portion of said line 2—2 and only the magnet of ring form and its enclosing non-magnetic or high reluctance member are taken in section at the level of the left-hand portion of line 2—2.

Fig. 3 is a sectional view showing a modified form of permanent bar magnet structure embodied as a seal for the valve stem.

Fig. 4 is a fragmentary sectional view showing a further modified form of the permanent bar magnet.

Fig. 5 is a fragmentary end view of the device of Fig. 4, the line 4—4 indicating the location of the section shown in Fig. 4.

In the specific form shown in Figs. 1 and 2 of the drawings, the housing comprising a shell 1 having alined fluid passages 2 and 3 extending therethrough and having a chamber 4 that extends transversely of the passages 2 and 3 and in which is housed a valve member 5, the chamber 4 being arranged to permit the necessary sidewise movement of member 5 for gate-valve operation to control the discharge of fluid through said passages 2 and 3.

In the form shown, the valve member 5 is a circular disc and has a circular boss 6 which is seated in a recess in the head 7 of an operating arm 8 whose hub 9 has a non-circular opening (here shown as square) fitting the correspondingly shaped end portion 10 of the operating stem 11 which extends outwardly from the housing shell 1 to receive a handle 12 or other device for rotating the stem 11 for shifting the valve member.

The housing also comprises a pair of removable portions, shown in the form of plugs 13 and 14 appropriately located for convenient assemblage of the working parts within the shell 1. The plug 13 is bored to receive the valve stem 11 and the plug 14 is in the form of a tubular nipple whereby the valve is connected to the line of piping which it serves.

The plug 14 is counterbored at its inner end to receive a hollow tubular magnet 15 of highly magnetic material, such as one of the well-known ferro-magnetic alloys, for example, one that is known by the trade name Alnico. The magnet cylinder 15 is permanently magnetized in such manner that its poles are at opposite ends thereof as in a bar magnet. The ends of the magnet cylinder 15 and plug 14, which are at the bottom in Fig. 1, are in flush alinement with each other and serve as a seat for the valve member 5. The other end of the cylindrical magnet 15 is in tight contact with the shoulder 16 of the counterbore in the plug 14.

The body part of the plug 14 and the member 5 are made of soft iron or other appropriate paramagnetic material that is highly permeable to magnetic flux. The body portion of the cylinder 15, between its poles, is separated from but integrally bonded to the adjacent parts of the plug 14 by a layer of non-magnetic material 17, such as brass. The magnetic flux is thus concentrated so as to exert a maximum pull per unit of contact area to urge the member 5 against the valve seat, as indicated by the small arrows in Fig. 1.

The structure of the plug 13 is analogous to that of the plug 14 in that it has integrally inserted therein a hollow cylindrical magnet 18 surrounded by a non-magnetic or highly reluctant layer 19 and with its pole 20 in firm contact with the material of the plug 13 and with its pole 21 flush with the lower end of the plug 13 to form a seat for the collar 22 on the valve stem 11. The cylindrical magnet 18, as here shown, has an inner lining 23 that serves as a bushing for the stem 11 and also serves as non-magnetic or high reluctance material to separate the magnet from said stem so as to provide maximum concentration of magnetic flux at the marginal portions of the collar 22.

The permanently magnetizable ferromagnetic alloys, like Alnico, are extremely hard and can be ground to a high polish which is essentially appropriate for providing long lived sealing contact between the respective magnets, and the valve member 5 or the stem collar 22.

In the form shown in Fig. 3, the magnet 25 has a pole piece 26 of tapered section for concentrating the flux at the points where it passes to or from the movable member to intensify the pull of the magnet on the movable member. Here the non-magnetic layer 27 is shaped to fill the gap between the magnet and the sides of the counterbore in the housing that holds the magnet. The magnet may also have one or more grooves or recesses 26.1 in its periphery for bonding it to the layer 27. The parts 24, 26 and 27 are, of course, finished to provide a plane seat surface for the valve member to slide upon. When the magnetic structure is used to assure sealing fit of a shaft or valve stem, a bushing of non-magnetic material should space it from the shaft or stem, as indicated at 27.1 of Fig. 3.

In the form shown in Figs. 4 and 5, the permanent magnet has a structure that is particularly appropriate for valves having seats of large diameter. Here instead of employing a single permanently magnetized hollow cylindrical bar, the magnet comprises an annular series of solid bar magnet units 29 embedded in a body member 28 with their exposed end poles flush with the plane of the seat surface. Here again the magnet bars have their opposite poles in good contact with the paramagnetic body and are separated along their sides from the paramagnetic body by non-magnetic material, 30 as shown. The bar magnet units 29 may also have one or more grooves 29.1 in their periphery for bonding them to the non-magnetic material 30.

The magnetic seal is especially appropriate in gate-valves because it avoids the necessity of employing springs to assure tightness of the joint and also assures that in its sliding movement the valve member or disc 5 wipes the surface of its seat clean of any materials which might gather thereon while the valve is open.

Another advantage of the magnetic seal is that while the magnetism offers great attraction to the valve member, it offers little resistance to its sliding movement on the seat.

The specific embodiments herein shown and described are believed sufficient to disclose the essential features of this invention, it being understood that numerous details of the structures shown may be altered or omitted without departing from the spirit of the invention as defined by the following claims.

I claim:
1. A valve, comprising a gate member, a housing having a seat having a surface on which said member is slidable and having a passage through said surface controlled by said member, a magnet having one pole in contact with said housing and the other pole flush with the seat surface, a layer of non-magnetic material separating the last-mentioned pole of said magnet from said housing, said housing being shaped to complete a closed magnetic circuit with said gate member in keeper relation to said magnet.

2. A device of the class described, comprising a housing having a fluid passage, a member slidable edgewise in a path across said passage for closing said passage, a permanent bar magnet embedded in said housing adjacent to said passage and having its first magnetic pole positioned to contact said member and having its opposite magnetic pole in contact with said housing, said housing comprising a permeable portion extending from said opposite magnetic pole to the path of said member, and a layer of non-magnetic material interposed between said permeable portion and the portion of said bar magnet between said poles.

3. In a valve, a housing having a passage and being shaped to form a seat in a transverse plane at one end of said passage, a hollow cylindrical magnet insert concentric with said passage and having one end pole in the plane of said seat, a gate of paramagnetic material in sliable contact with said seat, said housing provided a paramagnetic connection between said seat and the opposite pole of said magnet and coacting with said gate in keeper relation to the poles of said magnet.

4. In a valve, a housing having a fluid passage and being shaped to form a seat at one end of said passage, an annular series of bar magnets embedded in said housing in generally parallel relation to and arranged around said passage with like poles of said magnets adjacent said seat, and a movable closure member mounted to cooperate with said housing in keeper relation to said series of magnets for controlling the flow through said passage.

5. In a valve, a paramagnetic housing having a fluid passage and being shaped to form a seat at one end of said passage, an annular series of bar magnets embedded in said housing in generally parallel relation to and arranged around said passage with like poles of said magnets in contact with said housing and like opposite poles of said magnets terminating at said seat, said opposite poles being magnetically insulated from said housing, and a movable member mounted to cooperate with said housing in keeper relation to said series of magnets, each of said magnets having the portion between its poles separated by non-magnetic material from said housing.

6. A valve comprising a paramagnetic housing, a passage in said housing, a paramagnetic gate member, a seat for said member on said housing at one end of said passage, means for sliding said member onto said seat across said passage, a tubular permanent magnet concentric with said passage, one pole of said tubular permanent magnet being flush with said seat and the remote pole being in contact with said housing, and high reluctance means between said seat and said tubular magnet, said gate member being adapted to bridge said high reluctance means between said magnet and housing.

7. A valve comprising a port means extending through a paramagnetic body, a counterbore in said port means providing a recessed shoulder concentric with said port, a floating port closure of paramagnetic material adapted to extend across said counterbored port and contact a portion of the surface of said body surrounding said port means, an operating arm for said floating port closure, an operating stem coacting with said arm to bring said closure over said counterbored port in sliding contact with said body, a permanent magnet insert within said counterbore, one pole of said insert being in contact with said shoulder and the other pole flush with the said surface of said paramagnetic body, and a high reluctance shield surrounding said insert and within said counterbore in said port.

8. The valve assembly of claim 7 wherein the permanent magnet insert comprises a hollow tubular magnet.

9. The valve assembly of claim 7 wherein the permanent magnet insert comprises a plurality of separate solid permanent magnets in a circular array within the counterbore.

10. In a valve, a right cylindrical permanent bar magnet having its poles at opposite ends thereof, a body of paramagnetic material in magnetic abutment with one pole of said magnet, said body having a portion concentric with said magnet, said concentric portion being separated from the magnet by a non-magnetic spacer, said body extending to a position of flush alignment with the other pole of said magnet, and a paramagnetic member seated on said other pole of said magnet and having a lateral dimension greater than said magnet and spacer combined so as to span concentric portions of said magnet and body in keeper relation to said magnet.

11. In a valve, a paramagnetic housing having a passage therethrough, a permanent magnet concentric with said passage, one pole of said magnet being in magnetic abutment with said housing and the other surrounding one end of the passage to form a valve seat, a high reluctance means surrounding said magnet to produce an annular gap at said valve seat, a member of paramagnetic material spanning said gap to form a closure for said passage, and means for sliding said member on the plane of said valve seat.

12. The apparatus of claim 10 wherein the cylindrical magnet is a hollow tubular magnet.

13. The apparatus of claim 10 wherein said paramagnetic member is a valve closure.

14. The apparatus of claim 10, wherein the said paramagnetic member is a stem collar.

IGOR B. SERGE.

REFERENCES CITED

The following references are of record in the file of this patent:

UNITED STATES PATENTS

| Number | Name | Date |
|---|---|---|
| 212,570 | German | Aug. 5, 1909 |
| 1,252,312 | Warren | Jan. 1, 1918 |
| 1,257,020 | Patterson | Feb. 19, 1918 |
| 1,319,787 | Morgan | Oct. 28, 1919 |
| 2,160,405 | Mallalieu | May 30, 1939 |
| 2,216,809 | Derby | Oct. 8, 1940 |
| 2,217,048 | Floss | Oct. 8, 1940 |